United States Patent
King

(10) Patent No.: US 9,152,373 B2
(45) Date of Patent: Oct. 6, 2015

(54) GESTURE VISUALIZATION AND SHARING BETWEEN ELECTRONIC DEVICES AND REMOTE DISPLAYS

(75) Inventor: Nicholas V. King, San Jose, CA (US)

(73) Assignee: Apple Inc., Cupertino, CA (US)

(*) Notice: Subject to any disclaimer, the term of this patent is extended or adjusted under 35 U.S.C. 154(b) by 773 days.

(21) Appl. No.: 13/084,779

(22) Filed: Apr. 12, 2011

(65) Prior Publication Data

US 2012/0262379 A1 Oct. 18, 2012

(51) Int. Cl.
*G06F 3/041* (2006.01)
*G06F 3/14* (2006.01)
*H04L 29/06* (2006.01)

(52) U.S. Cl.
CPC .............. *G06F 3/1454* (2013.01); *H04L 67/38* (2013.01); *G09G 2340/0407* (2013.01); *G09G 2340/06* (2013.01); *G09G 2354/00* (2013.01); *G09G 2370/04* (2013.01)

(58) Field of Classification Search
CPC ... H04L 1/0057; H04L 1/0041; H04L 1/0045; H04L 1/006
USPC .......................................... 345/173; 715/740
See application file for complete search history.

(56) References Cited

U.S. PATENT DOCUMENTS

| 5,311,207 | A * | 5/1994 | Kusumoto et al. ............ 345/601 |
| 5,652,849 | A | 7/1997 | Conway et al. |
| 5,825,336 | A | 10/1998 | Fujita et al. |
| 6,396,523 | B1 | 5/2002 | Seral et al. |
| 6,564,380 | B1 | 5/2003 | Murphy |
| 6,633,281 | B2 | 10/2003 | Lin et al. |
| 6,765,557 | B1 | 7/2004 | Segal et al. |
| 6,914,551 | B2 | 7/2005 | Vidal |
| 7,230,563 | B2 | 6/2007 | Vidal |
| 7,535,465 | B2 | 5/2009 | Morse et al. |
| 7,733,808 | B2 | 6/2010 | Hu |
| 2002/0097229 | A1 | 7/2002 | Rose et al. |
| 2005/0015812 | A1 | 1/2005 | Banet |

(Continued)

FOREIGN PATENT DOCUMENTS

| JP | H09-022339 | 1/1997 |
| JP | H09-097042 | 4/1997 |

(Continued)

OTHER PUBLICATIONS

"UPnP Media Controller" [Online]. Cidero. [retreived on Dec. 12, 2007]: <URL: www.cidero.com/mediacontroller.html>.

(Continued)

*Primary Examiner* — Kwang-Su Yang
(74) *Attorney, Agent, or Firm* — Michael H. Lyons

(57) ABSTRACT

The disclosed embodiments provide a system that facilitates interaction between an electronic device and a remote display. The system includes a first application and an encoding apparatus on the electronic device, and a second application and a decoding apparatus on the remote display. The encoding apparatus obtains graphical output for a display of the electronic device and a first set of touch inputs associated with the graphical output from a first touch screen. Next, the encoding apparatus encodes the graphical output, and the first application transmits the graphical output and the first set of touch inputs to the remote display. Upon receiving the graphical output and the first set of touch inputs at the remote display, the decoding apparatus decodes the graphical output. The second application then uses the graphical output and a visual representation of the first set of touch inputs to drive the remote display.

25 Claims, 6 Drawing Sheets

(56) References Cited

U.S. PATENT DOCUMENTS

| | | | |
|---|---|---|---|
| 2006/0026536 A1 | 2/2006 | Hotelling et al. | |
| 2006/0284785 A1 | 12/2006 | Bitterlich et al. | |
| 2007/0200923 A1 | 8/2007 | Eleftheriadis | |
| 2008/0115073 A1* | 5/2008 | Erickson et al. | 715/766 |
| 2008/0178224 A1 | 7/2008 | Laude et al. | |
| 2008/0244426 A1* | 10/2008 | Klask | 715/764 |
| 2009/0153288 A1 | 6/2009 | Hope et al. | |
| 2009/0284476 A1* | 11/2009 | Bull et al. | 345/173 |
| 2009/0295905 A1* | 12/2009 | Civanlar et al. | 348/14.09 |
| 2010/0020033 A1* | 1/2010 | Nwosu | 345/173 |
| 2011/0018817 A1 | 1/2011 | Kryze et al. | |
| 2011/0029915 A1* | 2/2011 | Harris | 715/781 |
| 2011/0246904 A1* | 10/2011 | Pinto et al. | 715/740 |
| 2012/0047305 A1* | 2/2012 | Drottar et al. | 710/305 |
| 2012/0060095 A1* | 3/2012 | Klappert | 715/722 |
| 2012/0162536 A1* | 6/2012 | Sibilsky et al. | 348/734 |

FOREIGN PATENT DOCUMENTS

| | | |
|---|---|---|
| JP | 2002-244987 | 8/2002 |
| JP | 2001-197461 | 7/2007 |
| JP | 2007-173952 | 7/2007 |
| JP | 2008-310443 | 12/2008 |
| JP | 2010-130445 | 6/2010 |
| JP | 2010-263324 | 11/2010 |
| KR | 10-2010-0102122 | 9/2010 |
| WO | 2009082621 | 7/2009 |

OTHER PUBLICATIONS

Kelly et al. "Designing RF Remote Controls for DTV Products" [Online]. Digital TV Design Line. [retreived on Nov. 7, 2007]: <URL: www.digitaltvdesignline.com/showArticle.jhtml?printableArticle=true&articleId=202100019>.

"Phillips and Samsung spearhead new CEA-2014 (web4CE) HTML-based remote user interfaces for UPnP home-networked applications and Internet services" [Online]. HiddenWires [retreived on Nov. 7, 2007]: <URL: hiddenwires.co.us/resourcenews2006/news20060223-12.html>.

* cited by examiner

GESTURE VISUALIZATION AND SHARING BETWEEN ELECTRONIC DEVICES AND REMOTE DISPLAYS

BACKGROUND

1. Field

The present embodiments relate to techniques for driving remote displays from electronic devices. More specifically, the present embodiments relate to techniques for driving a remote display using visualizations of gestures on an electronic device, as well as techniques for sharing gestures between the electronic device and the remote display.

2. Related Art

Modern portable electronic devices typically include functionality to create, store, open, and/or update various forms of digital media. For example, a mobile phone may include a camera for capturing images, memory in which images may be stored, software for viewing images, and/or software for editing images. Moreover, the portability and convenience associated with portable electronic devices allows users of the portable electronic devices to incorporate digital media into everyday activities. For example, the camera on a mobile phone may allow a user of the mobile phone to take pictures at various times and in multiple settings, while the display screen on the mobile phone and installed software may allow the user to display the pictures to others.

However, size and resource limitations may prevent users of portable electronic devices from effectively sharing media on the portable electronic devices. For example, the display screen on a tablet computer may be too small to be used in a presentation to a large group of people. Instead, the user of the tablet computer may conduct the presentation by driving a large remote display using a screen sharing application on the tablet computer.

Hence, what is needed is a mechanism for facilitating the sharing of media from a portable electronic device.

SUMMARY

The disclosed embodiments provide a system that facilitates interaction between an electronic device and a remote display. The system includes a first application and an encoding apparatus on the electronic device, and a second application and a decoding apparatus on the remote display. The encoding apparatus obtains graphical output for a display of the electronic device and a first set of touch inputs associated with the graphical output from a first touch screen. Next, the encoding apparatus encodes the graphical output, and the first application transmits the graphical output and the first set of touch inputs to the remote display. Upon receiving the graphical output and the first set of touch inputs at the remote display, the decoding apparatus decodes the graphical output. The second application then uses the graphical output and a visual representation of the first set of touch inputs to drive the remote display.

In some embodiments, the second application also obtains a second set of touch inputs associated with the graphical output from a second touch screen and transmits the second set of touch inputs to the electronic device. The first application then updates the graphical output based on the second set of touch inputs.

In some embodiments, the first application also identifies the remote display as a source of the second set of touch inputs. The identified remote display may enable modification of the graphical output by the first application prior to transmitting the graphical output to the remote display and/or transmission of data from the first application to the remote display based on the second set of touch inputs.

In some embodiments, transmitting the graphical output and the first set of touch inputs to the remote display involves at least one of compositing the visual representation of the first set of touch inputs into the graphical output, and transmitting the first set of touch inputs as auxiliary data associated with the graphical output to the remote display.

In some embodiments, using the graphical output and the visual representation of the first set of touch inputs to drive the remote display involves:

(i) drawing the graphical output to a first buffer;
(ii) drawing the visual representation of the first set of touch inputs to a second buffer; and
(iii) using the first and second buffers to drive the remote display.

In some embodiments, the electronic device is at least one of a mobile phone, a tablet computer, and a portable media player.

In some embodiments, the remote display is at least one of a tablet computer, a mobile phone, a portable media player, a projector, and a monitor.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
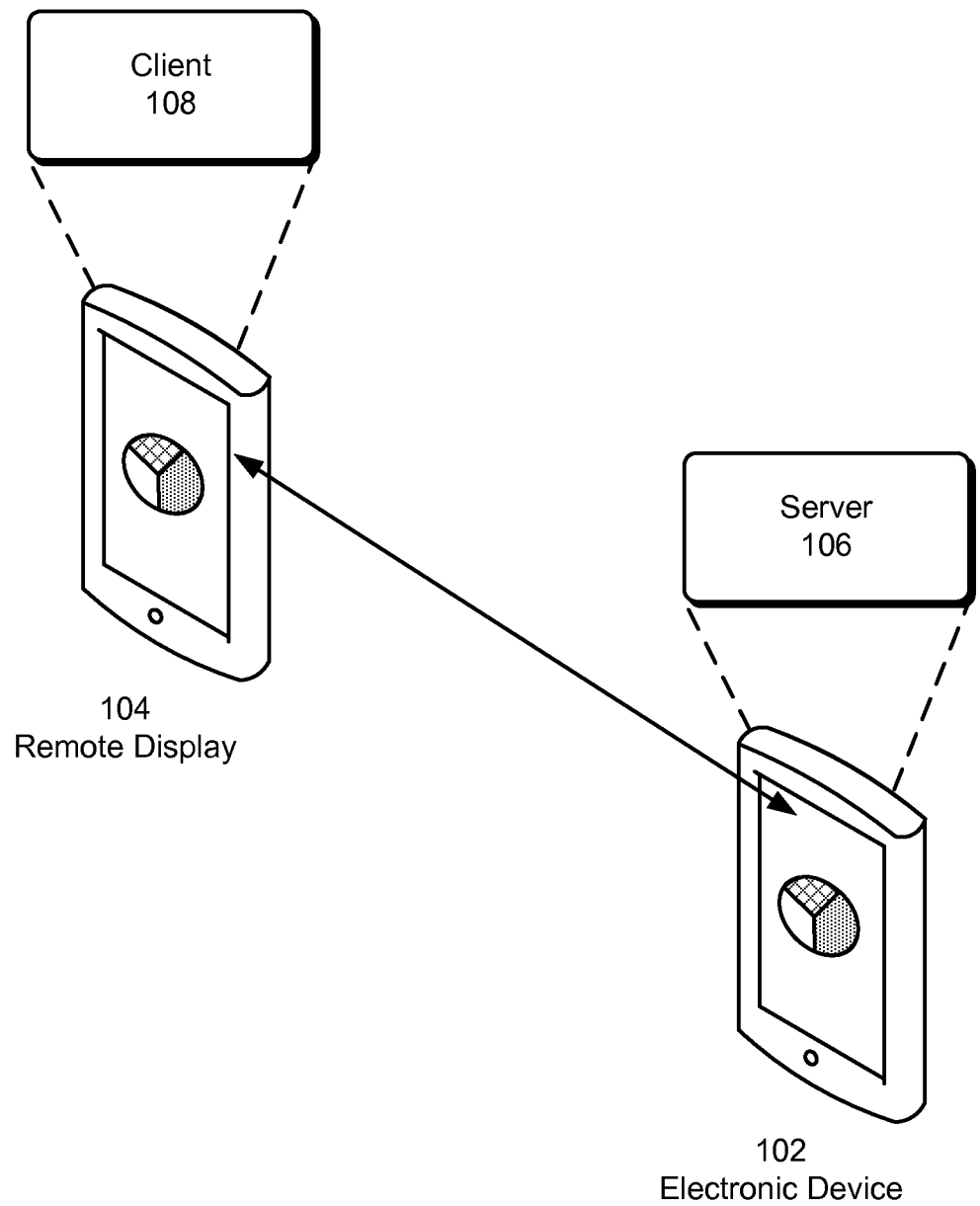
FIG. 1 shows a schematic of a system in accordance with an embodiment.

FIG. 1 shows a schematic of a system in accordance with an embodiment. The system includes an electronic device 102 and a remote display 104. Electronic device 102 may correspond to a mobile phone, tablet computer, portable media player, and/or other compact electronic device that includes functionality to store digital media such as documents, images, audio, and/or video. Remote display 104 may also correspond to a compact electronic device such as a tablet computer, mobile phone, and/or portable media player, or remote display 104 may include a projector, monitor, and/or other type of electronic display that is external to and/or larger than a display on electronic device 102.

In one or more embodiments, remote display 104 facilitates the sharing of digital media from electronic device 102. In particular, electronic device 102 may be used to drive remote display 104 so that graphical output on remote display 104 is substantially the same as graphical output on electronic device 102. For example, a user of electronic device 102 may control the display of a photo slideshow, presentation, and/or document on both remote display 104 and electronic device 102 from an application on electronic device 102. Because remote display 104 provides additional space for displaying the graphical output, remote display 104 may allow the photo slideshow, presentation, and/or document to be viewed by more people than if the photo slideshow, presentation, and/or document were displayed only on electronic device 102.

To enable the driving of remote display 104 from electronic device 102, a server 106 on electronic device 102 may be used to communicate with a client 108 on remote display 104. Server 106 may transmit graphical output from electronic device 102 to client 108, and client 108 may update remote display 104 with the graphical output. For example, server 106 and client 108 may correspond to a remote desktop server and remote desktop client that communicate over a network connection between electronic device 102 and remote display 104. The remote desktop server may propagate changes to the desktop and/or display of electronic device 102 to the remote desktop client, and the remote desktop client may update remote display 104 accordingly. In other words, server 106 and client 108 may allow electronic device 102 to drive remote display 104 without connecting to remote display 104 using a video interface such as Digital Visual Interface (DVI), High-Definition Multimedia Interface (HDMI), and/or DisplayPort.

Server 106 and client 108 may additionally be configured to drive remote display 104 using visual representations of a first set of touch inputs from electronic device 102 and/or update the graphical output based on a second set of touch inputs from remote display 104. As discussed in further detail below with respect to FIG. 2, a first application associated with server 106 may obtain a first set of touch inputs from a first touch screen associated with (e.g., provided by) electronic device 102. Each of the touch inputs may correspond to a tapping gesture, a swiping gesture, a pinching gesture, a rotating gesture, and/or another touch-based gesture on the touch screen. Next, server 106 may transmit the first set of touch inputs, along with the graphical output, to remote display 104. A second application associated with client 108 may then use the graphical output and a visual representation of the first set of touch inputs to drive remote display 104. For example, the second application may update remote display 104 with the graphical output, as well as a set of dots representing locations of the first set of touch inputs within the graphical output.

The second application may additionally obtain the second set of touch inputs from a second touch screen associated with (e.g., provided by) remote display 104. As with the first set of touch inputs, the second set of touch inputs may include a number of touch-based gestures. Next, client 108 may transmit the second set of touch inputs to electronic device 102, and the first application may update the graphical output based on the second set of touch inputs. For example, the first application may use the second set of touch inputs to update the graphical output as if the second set of touch inputs were received from the first touch screen on the electronic device. On the other hand, the first application may identify the remote display as a source of the second set of touch inputs. The first application may then use the identified remote display and/or second set of touch inputs to generate a graphical overlay that is displayed over the graphical output on the remote display. The first application may also transmit data to the remote display based on the second set of touch inputs. Consequently, the first and second applications may facilitate both the sharing of digital media from electronic device 102 and interaction between electronic device 102 and remote display 104.

Figure 2:
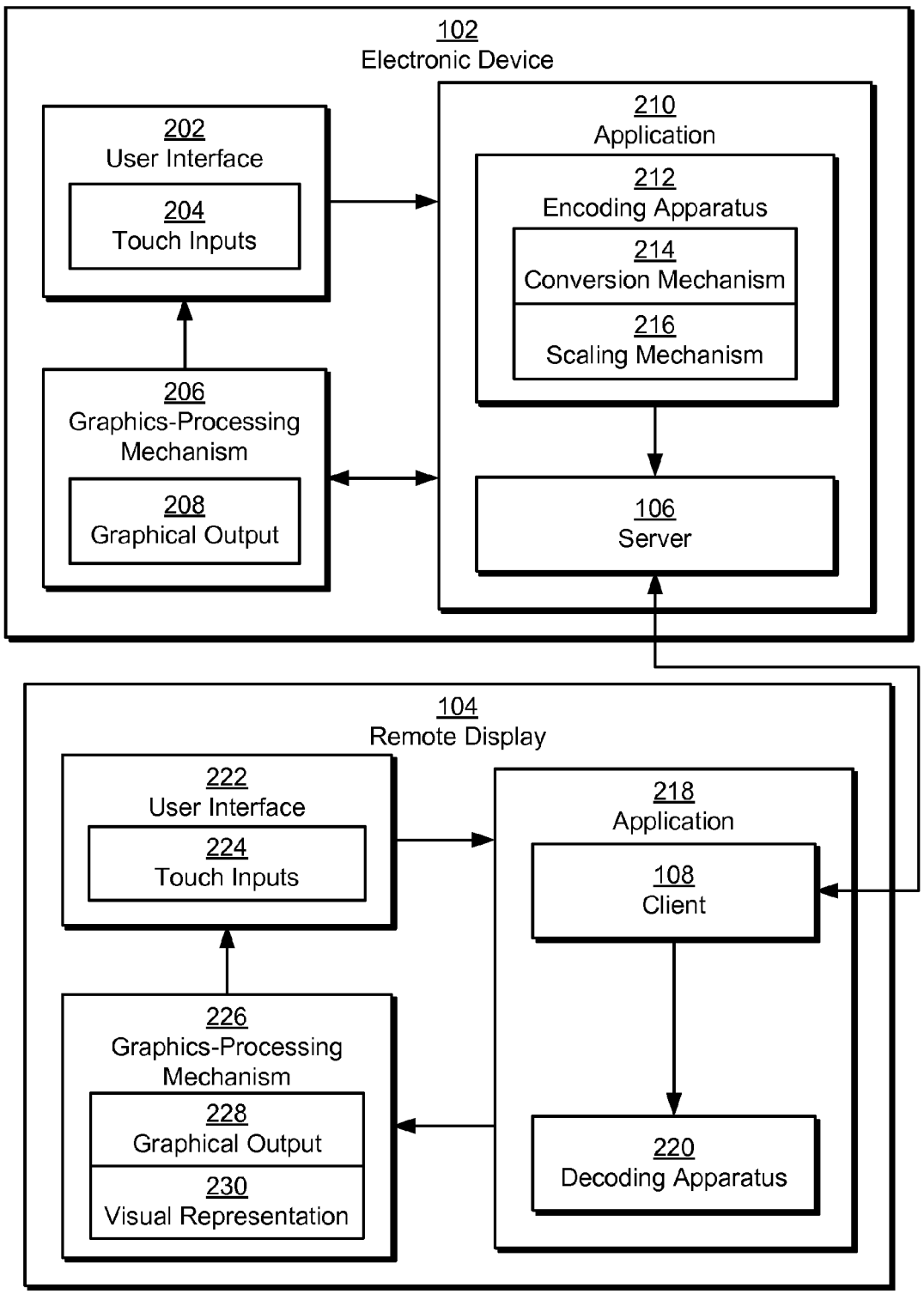
FIG. 2 shows a system for facilitating interaction between an electronic device and a remote display in accordance with an embodiment.

FIG. 2 shows a system for facilitating interaction between electronic device 102 and remote display 104 in accordance with an embodiment. As described above, electronic device 102 may drive remote display 104 so that graphical output 208 on electronic device 102 is substantially the same as graphical output 228 on remote display 104. For example, electronic device 102 may enable the display of a presentation, photo slideshow, and/or document on both remote display 104 and the display of electronic device 102.

To drive remote display 104 from electronic device 102, a first application 210 associated with server 106 may generate graphical output 208 using a graphics-processing mechanism 206 (e.g., graphics-processing unit (GPU), graphics stack, etc.) in electronic device 102. For example, application 210 may provide a user interface 202 (e.g., graphical user interface (GUI)) that obtains a series of touch inputs 204 (e.g., gestures) from a user through a touch screen associated with electronic device 102. Application 210 may then issue draw commands to graphics-processing mechanism 206 based on touch inputs 204 to generate graphical output 208 that is shown within user interface 202 and/or the touch screen. As a result, the user may interact with application 210 by providing touch inputs 204 to application 210 through the touch screen and/or user interface 202 and receiving graphical output 208 from application 210 through the touch screen and/or user interface 202.

After graphical output 208 is generated by graphics-processing mechanism 206, graphical output 208 may be obtained by application 210 and encoded by an encoding apparatus 212 associated with application 210. During encoding, a conversion mechanism 214 in encoding apparatus 212 may convert graphical output 208 from a first color space to a second color space, and a scaling mechanism 216 may scale graphical output 208. For example, encoding apparatus 212 may include functionality to encode graphical output 208 using an H.264 codec. Conversion mechanism 214 may thus convert graphical output 208 from an RGB color space into a YUV color space. At the same time, scaling mechanism 216 may scale graphical output 208 up or down to allow graphical output 208 to match the resolution of remote display 104.

Once graphical output 208 is encoded, server 106 may transmit graphical output 208 to client 108 over a network (e.g., wireless network, local area network (LAN), wide area network (WAN), etc.) connection. A second application 218 associated with client 108 may then use graphical output 208 to update remote display 104. More specifically, a decoding apparatus 220 associated with application 218 may decode graphical output 208. For example, decoding apparatus 220 may include an H.264 codec that obtains frames of pixel values from the encoded graphical output 208. The pixel values may then be sent to a graphics-processing mechanism 226 (e.g., GPU, graphics stack) in remote display 104 and used by graphics-processing mechanism 226 to generate graphical output 228 for driving remote display 104. As with display of graphical output 208 in electronic device 102, graphical output 228 may be shown within a user interface 222 provided by application 218 and/or a touch screen associated with remote display 104.

As mentioned previously, a visual representation 230 of touch inputs 204 may also be used to drive remote display 104. More specifically, touch inputs 204 may be obtained by application 210 and/or server 106 and transmitted along with graphical output 208 to client 108. Visual representation 230 may be generated using touch inputs 204 and provided to graphics-processing mechanism 226 so that graphics-processing mechanism 226 may drive remote display 104 using visual representation 230. For example, visual representation 230 may include a set of dots representing the locations of touch inputs 204 within graphical output 208 and 228. As a result, visual representation 230 may be generated by drawing a dot at each location associated with touch inputs 204. Visual representations of touch inputs are discussed in further detail below with respect to FIG. 3.

In one or more embodiments, visual representation 230 is generated by application 210 and/or graphics-processing mechanism 206 and composited into graphical output 208 at electronic device 102. Consequently, server 106 may transmit a single data stream containing graphical output 208 and visual representation 230 to client 108. The data stream may then be decoded by decoding apparatus 220 and used by graphics-processing mechanism 226 to drive remote display 104.

On the other hand, application 210 and/or server 106 may transmit touch inputs 204 as auxiliary data associated with graphical output 208 to client 108. For example, graphical output 208 may be transmitted through a main communication channel between server 106 and client 108, while touch inputs 204 may be transmitted through a sideband channel between server 106 and client 108. As a result, application 218 and/or graphics-processing mechanism 226 may drive remote display 104 by drawing graphical output 228 to a first buffer, drawing visual representation 230 to a second buffer, and using the first and second buffers to drive the remote display.

Interaction between electronic device 102 and remote display 104 may additionally be facilitated by allowing touch inputs 224 from remote display 104 to be used in the update of graphical output 208 and 228. A user of remote display 104 may provide touch inputs 224 as touch-based gestures through a touch screen associated with remote display 104. User interface 222 and/or application 218 may obtain touch inputs 224 from the touch screen, and client 108 may transmit touch inputs 224 to server 106 and/or application 210.

Next, application 210 may update graphical output 208 based on touch inputs 224. For example, application 210 may generate graphical output 208 from touch inputs 224 as if touch inputs 224 were received from user interface 202 and/or the touch screen associated with electronic device 102. In other words, transmission of touch inputs 224 to electronic device 102 may allow a user to interact with application 210 from remote display 104 in the same way as the user would from electronic device 102.

Conversely, server 106 and/or application 210 may include functionality to identify remote display 104 as the source of touch inputs 224. Such identification of remote display 104 may allow application 210 to modify graphical output 208 based on touch inputs 224 prior to transmitting graphical output 208 to remote display 104 and/or transmit data to remote display 104 based on touch inputs 224.

For example, application 210 may use touch inputs 224 to generate a graphical overlay for graphical output 208 that is transmitted with graphical output 208 to client 108 but not provided to graphics-processing mechanism 206. Next, application 218 may provide the graphical overlay and graphical output 208 to graphics-processing mechanism 226, which drives remote display 104 using both the graphical overlay and graphical output 208. As a result, the graphical overlay may be shown within user interface 222 and/or remote display 104 but not within user interface 202 and/or the display (e.g., touch screen) on electronic device 102. Touch inputs 224 associated with the graphical overlay within user interface 222 may then be transmitted to server 106 and used by application 210 to update the graphical overlay and/or transmit data associated with the graphical overlay to remote display 104. Modification of graphical output 208 and/or transmission of data to remote display 104 based on touch inputs 224 is discussed in further detail below with respect to FIG. 4.

Consequently, applications 210 and 218 may allow electronic device 102 and/or remote display 104 to visualize and/or share graphical output 208 and 228 and touch inputs 204 and 224. In turn, applications 210 and 218 may facilitate the sharing of digital media from electronic device 102, as well as interaction between electronic device 102 and remote display 104. For example, the transmission of graphical output 208 and touch inputs 204 from application 210 to application 218 may allow a user of remote display 104 to view user interface 202 on remote display 104 and/or observe the use of electronic device 102 by another user. Similarly, the transmission of touch inputs 224 from application 218 to application 210 may allow the user of remote display 104 to interact with application 210 and/or obtain data (e.g., digital media) from electronic device 102.

Those skilled in the art will appreciate that the system of FIG. 2 may be implemented in a variety of ways. First, encoding apparatus 212 and server 106 may execute within application 210 and/or independently of application 210. Along the same lines, decoding apparatus 220 and client 108 may execute within application 218 and/or independently of application 218. Moreover, applications 210 and 218 may correspond to identical applications that each implement encoding apparatus 212, server 106, client 108, and decoding apparatus 220 to enable viewing of and/or interaction with either user interface 202 or user interface 222 from both electronic device 102 and remote display 104. On the other hand, applications 210 and 218 may occupy complementary roles, such that only one user interface (e.g., user interface 202) is accessible from both electronic device 102 and remote display 104.

Figure 3:
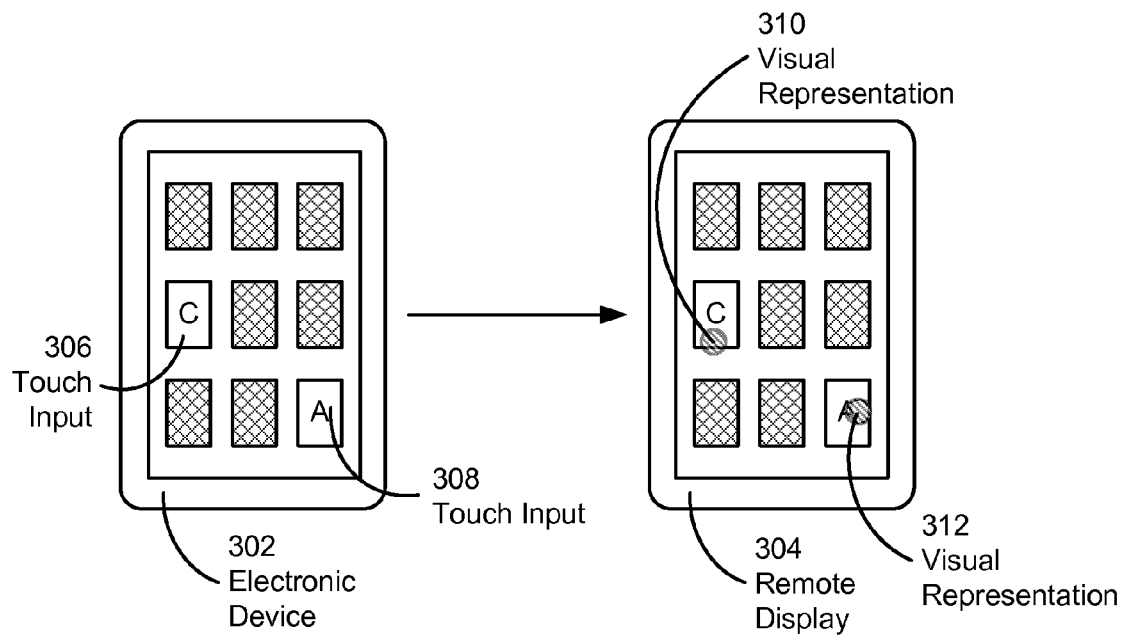
FIG. 3 shows an exemplary interaction between an electronic device and a remote display in accordance with an embodiment.

FIG. 3 shows an exemplary interaction between an electronic device 302 and a remote display 304 in accordance with an embodiment. Electronic device 302 may be used to drive remote display 304 so that graphical output on remote display 304 is substantially the same as graphical output on electronic device 302. For example, graphical output for a display of electronic device 302 may be transmitted to remote display 304 and used to drive remote display 304.

In addition, a set of touch inputs 306-308 may be obtained from electronic device 302. Touch inputs 306-308 may be associated with tapping gestures, swiping gestures, pinching gestures, rotating gestures, and/or other touch-based gestures on a touch screen associated with electronic device 302. Touch inputs 306-308 may also be transmitted to remote display 304 to enable the driving of remote display 304 using visual representations 310-312 of touch inputs 306-308. For example, visual representations 310-312 may correspond to dots that represent the locations of touch inputs 306-308 within the graphical output. Visual representations 310-312 may also persist for a period after touch inputs 306-308 cease and/or change location to convey motion information (e.g., lines, arcs, etc.) associated with touch inputs 306-308 to a user of remote display 304. In other words, visual representations 310-312 may allow the user of remote display 304 to observe the use of electronic device 302 by a different user.

In particular, touch inputs 306-308 may be transmitted to remote display 304 by compositing visual representations 310-312 into the graphical output of electronic device 302 prior to transmitting the graphical output to remote display 304. The graphical output and touch inputs 306-308 may thus be transmitted as a single data stream to remote display 104 and drawn to a single buffer that is used to drive remote display 304. Alternatively, touch inputs 306-308 may be transmitted as auxiliary data associated with the graphical output to remote display 304. As a result, the graphical output may be drawn to a first buffer, visual representations 310-312 may be drawn to a second buffer based on touch inputs 306-308, and the first and second buffers may be used to drive remote display 304.

Figure 4:
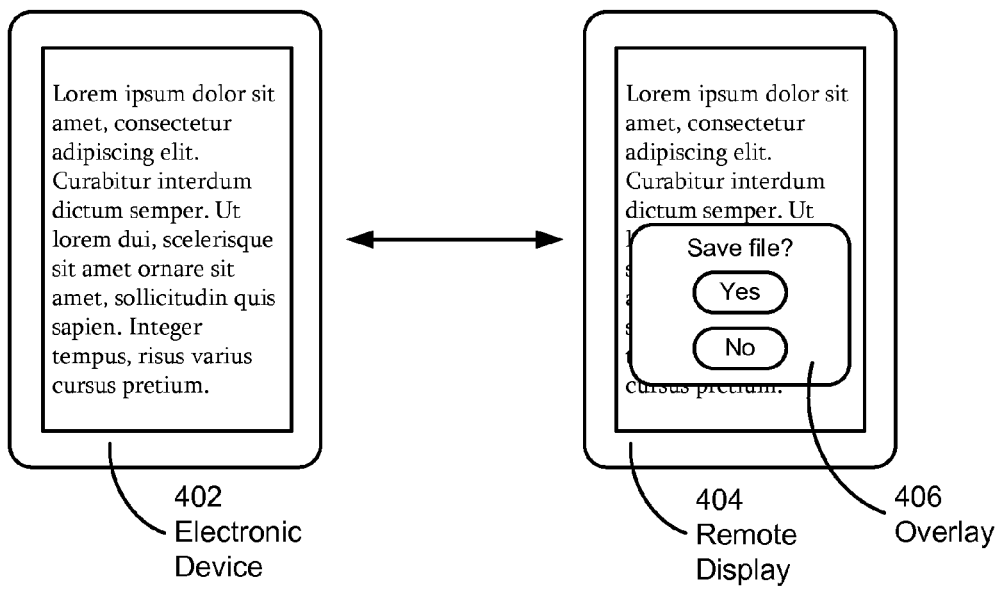
FIG. 4 shows an exemplary interaction between an electronic device and a remote display in accordance with an embodiment.

FIG. 4 shows an exemplary interaction between an electronic device 402 and a remote display 404 in accordance with an embodiment. Like electronic device 302 and remote display 304 of FIG. 3, electronic device 402 may be used to drive remote display 404 so that graphical output is substantially the same on both electronic device 402 and remote display 404.

However, a graphical overlay 406 is shown on remote display 404 but not on electronic device 402. Overlay 406 may result from the transmission of touch inputs from remote display 404 to electronic device 402, as well as the subsequent processing of the touch inputs by an application on electronic device 402. For example, the application may generate overlay 406 by updating the graphical output based on the touch inputs prior to transmitting the graphical output to remote display 404 but not prior to using the graphical output to drive a display (e.g., touch screen) on electronic device 402.

Overlay 406 may also facilitate the transmission of data from the application to remote display 404 based on the touch inputs. For example, overlay 406 may correspond to a dialog box that gives a user of remote display 404 an option to save a file associated with the graphical output and another option to not save the file. Touch inputs provided by the user within the dialog box may then be sent to electronic device 402 for processing by the application. If the application determines that the touch inputs represent the selection of the option to save the file, the application may remove overlay 406 from remote display 404 and transmit data for the file to remote display 404. In addition, the application may generate a dialog box on electronic device 402 to query the user of electronic device 402 for permission to transmit the data to remote display 404, or the application may transmit the data without obtaining permission from the user of electronic device 402. Conversely, if the application determines that the touch inputs represent the selection of the option to not save the file, the application may remove overlay 406 from remote display 404 without transmitting file data to remote display 404.

Figure 5:
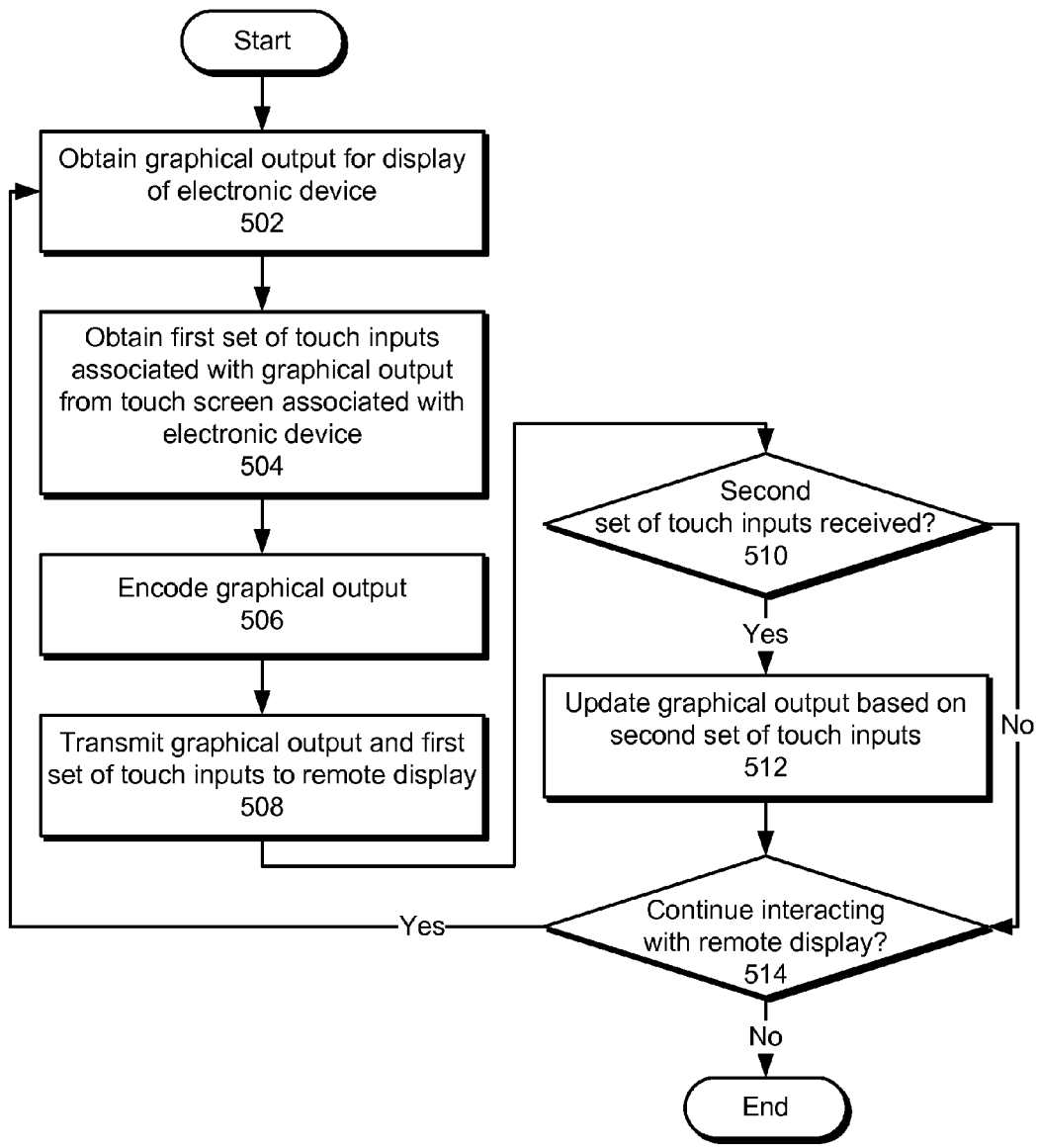
FIG. 5 shows a flowchart illustrating the process of interacting with a remote display in accordance with an embodiment.

FIG. 5 shows a flowchart illustrating the process of interacting with a remote display in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

First, graphical output for a display of an electronic device is obtained (operation 502), and a first set of touch inputs associated with the graphical output is obtained from a touch screen associated with the electronic device (operation 504). Next, the graphical output is encoded (operation 506). For example, the graphical output may be encoded using an H.264 codec that converts the graphical output from a first color space to a second color space and/or scales the graphical output.

The graphical output and first set of touch inputs are then transmitted to the remote display (operation 508), where the graphical output and a visual representation of the first set of touch inputs are used to drive the remote display. Driving of the remote display using the graphical output and visual representation of the first set of touch inputs is discussed in further detail below with respect to FIG. 6.

A second set of touch inputs may also be received (operation 510) from the remote display. If the second set of touch inputs is not received, no processing related to the second set of touch inputs is performed. If the second set of touch inputs is received, the graphical output is updated based on the second set of touch inputs (operation 512). For example, the second set of touch inputs may be provided to an application configured to generate the graphical output. The application may process the second set of touch inputs as if the second set of touch inputs were obtained through the touch screen of the electronic device. Alternatively, the application may identify the remote display as a source of the second set of touch inputs and modify the graphical output prior to transmitting the graphical output to the remote display. The application may also use the identification of the remote display to transmit data to the remote display based on the second set of touch inputs.

Interaction with the remote display may continue (operation 514). For example, the electronic device may interact with the remote display as long as a network connection exists between the electronic device and remote display and/or digital media is being shared between the electronic device and remote display. If interaction with the remote display is to continue, the graphical output and the first set of touch inputs are obtained (operations 502-504), the graphical output is encoded (operation 506), and the graphical output and first set of touch inputs are transmitted to the remote display (operation 508). At the same time, the second set of touch inputs may also be received (operation 510) from the remote display and used to update the graphical output (operation 512). The graphical output and visual representation of the first set of touch inputs may continue to be obtained, modified, and/or transmitted until interaction between the electronic device and the remote display ceases.

Figure 6:
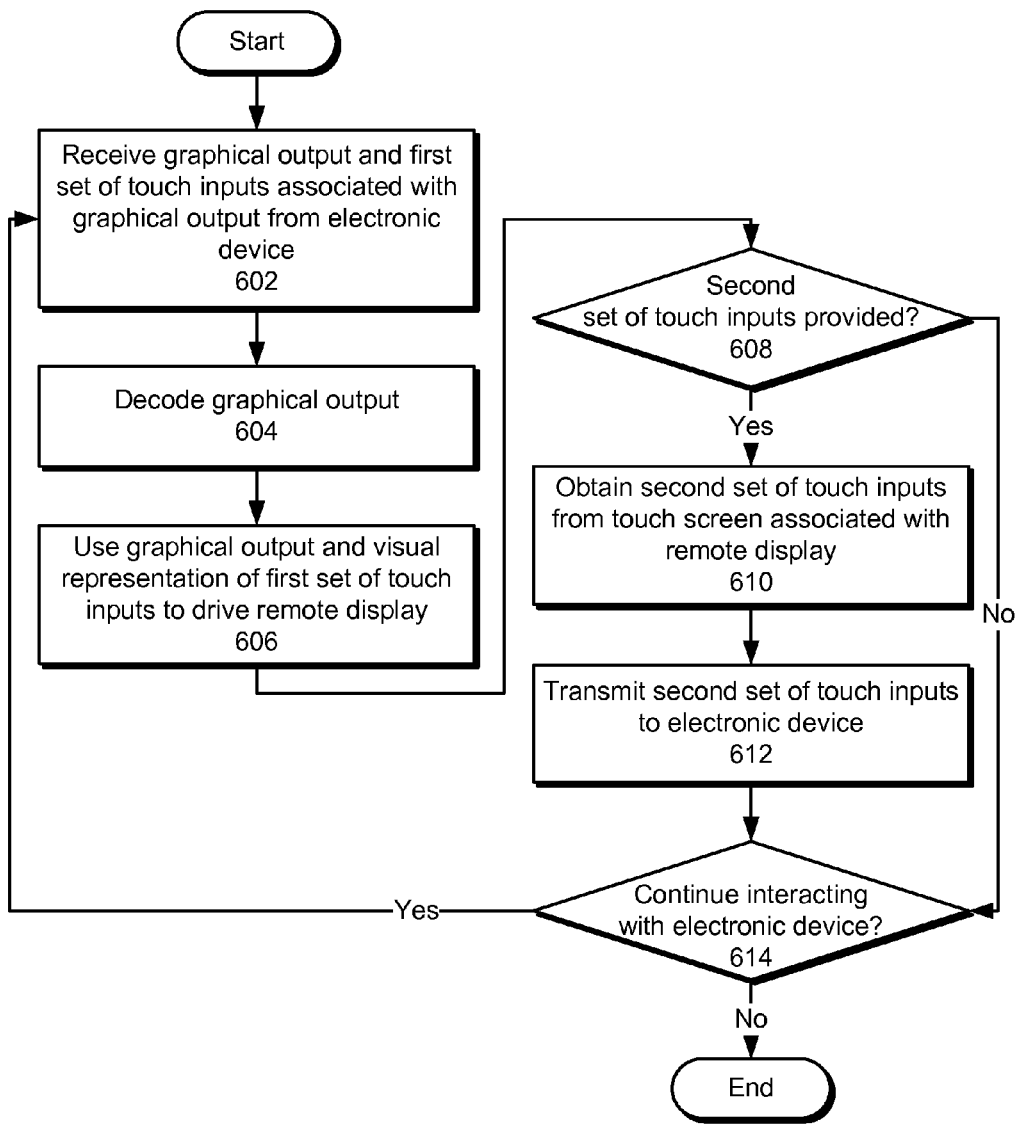
FIG. 6 shows a flowchart illustrating the process of interacting with an electronic device in accordance with an embodiment.

FIG. 6 shows a flowchart illustrating the process of interacting with an electronic device in accordance with an embodiment. In one or more embodiments, one or more of the steps may be omitted, repeated, and/or performed in a different order. Accordingly, the specific arrangement of steps shown in FIG. 6 should not be construed as limiting the scope of the embodiments.

Initially, graphical output and a first set of touch inputs associated with the graphical output are obtained from the electronic device (operation 602). The first set of touch inputs may be composited into the graphical output and/or transmitted as auxiliary data associated with the graphical input. Next, the graphical output is decoded (operation 604). For example, an H.264 codec may be used to obtain frames of pixel values from the graphical output.

The graphical output and a visual representation of the first set of touch inputs are then used to drive a remote display (operation 606). If the first set of touch inputs is composited into the graphical output, the composited graphical output may be drawn to a single buffer that is used to drive the remote display. If the first set of touch inputs is transmitted as auxiliary data, the graphical output may be drawn to a first buffer, the visual representation of the first set of touch inputs may be drawn to a second buffer, and the first and second buffers may be used to drive the remote display.

A second set of touch inputs may also be provided (operation 608) by a user of the remote display. If the second set of touch inputs is not provided, no processing related to the second set of touch inputs is performed. If the second set of touch inputs is provided, the second set of touch inputs is obtained from a touch screen associated with the remote display (operation 610) and transmitted to the electronic device (operation 612). The second set of touch inputs may then be used by the electronic device to update the graphical output and/or transmit data to the remote display.

Interaction with the electronic device may continue (operation 614). If interaction with the electronic device is to continue, the graphical output and first set of touch inputs are received from the electronic device (operation 602), the graphical output is decoded (operation 604), and the graphical output and a visual representation of the first set of touch inputs is used to drive the remote display (operation 606). Concurrently, a second set of touch inputs may be provided (operation 608) by a user of the remote display, obtained from the touch screen (operation 610), and transmitted to the electronic device (operation 612). Use of the graphical output and visual representation to drive the remote display and transmission of the second set of touch inputs to the electronic device may continue until interaction between the remote display and the electronic device ceases.

Figure 7:
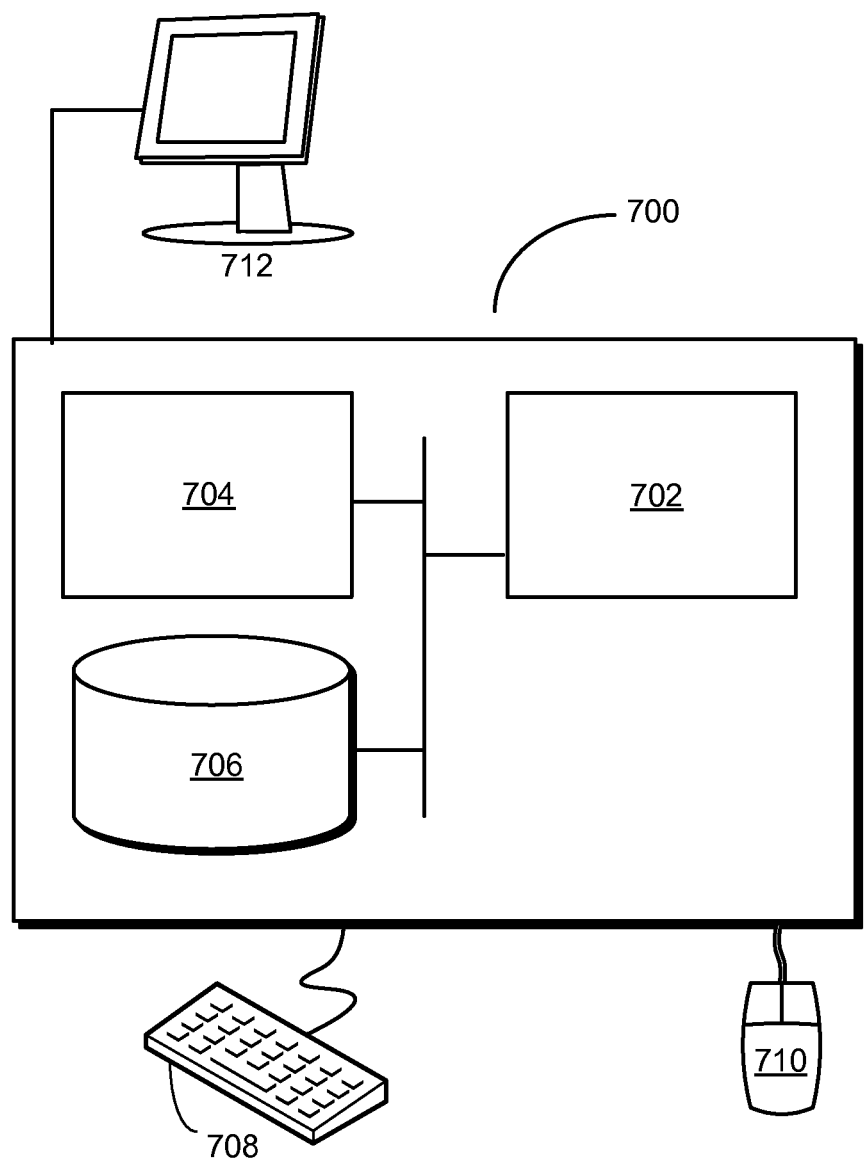
FIG. 7 shows a computer system in accordance with an embodiment.

FIG. 7 shows a computer system 700 in accordance with an embodiment. Computer system 700 may correspond to an apparatus that includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for facilitating interaction between an electronic device and a remote display. The system may include a first application and an encoding apparatus on the electronic device, and a second application and a decoding apparatus on the remote display. The encoding apparatus may obtain graphical output for a display of the electronic device and a first set of touch inputs associated with the graphical output from a first touch screen on the electronic device. The encoding apparatus may encode the graphical output, and the first application may transmit the graphical output and the first set of touch inputs to the remote display. Upon receiving the graphical output and the first set of touch inputs at the remote display, the decoding apparatus may decode the graphical output. The second application may then use the graphical output and a visual representation of the first set of touch inputs to drive the remote display.

Furthermore, the second application may obtain a second set of touch inputs associated with the graphical output from a second touch screen on the remote display and transmit the second set of touch inputs to the electronic device. The first application may then update the graphical output based on the second set of touch inputs. For example, the first application may identify the remote display as a source of the second set of touch inputs. The first application may then use the second set of touch inputs to generate an overlay that is displayed over the graphical output on the remote display. The first application may also transmit data to the remote display based on the second set of touch inputs.

In addition, one or more components of computer system 700 may be remotely located and connected to the other components over a network. Portions of the present embodiments (e.g., first application, second application, encoding apparatus, decoding apparatus, etc.) may also be located on different nodes of a distributed system that implements the embodiments. For example, the present embodiments may be implemented using a cloud computing system that communicates with the electronic device using a network connection with the electronic device and displays graphical output and a visual representation of the first set of touch inputs from the electronic device on a set of remote displays.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for interacting with a remote display, comprising:

obtaining graphical output for a display of an electronic device;

obtaining a first set of touch inputs associated with the graphical output from a touch screen associated with the electronic device; and transmitting the graphical output and the first set of touch inputs to the remote display, wherein the graphical output and a visual representation of the first set of touch inputs are used to drive the remote display, and wherein the visual representation of the first set of touch inputs comprises a set of dots and is not displayed on the display of the electronic device.

2. The computer-implemented method of claim 1, further comprising:

encoding the graphical output prior to transmitting the graphical output to the remote display.

3. The computer-implemented method of claim 2, wherein encoding the graphical output comprises:

converting the graphical output from a first color space to a second color space.

4. The computer-implemented method defined in claim 2, wherein encoding the graphical output prior to transmitting the graphical output to the remote display comprises:

scaling the graphical output.

5. The computer-implemented method of claim 1, further comprising:

receiving a second set of touch inputs from the remote display; and updating the graphical output based on the second set of touch inputs.

6. The computer-implemented method of claim 5, wherein updating the graphical output based on the second set of touch inputs comprises:

providing the second set of touch inputs to an application configured to generate the graphical output.

7. The computer-implemented method of claim 6, wherein updating the graphical output based on the second set of touch inputs further comprises:

identifying the remote display as a source of the second set of touch inputs, wherein the identified remote display enables modification of the graphical output by the application prior to transmitting the graphical output to the remote display.

8. The computer-implemented method of claim 7, wherein the identified remote display further enables the transmission of data from the application to the remote display based on the second set of touch inputs.

9. The computer-implemented method of claim 1, wherein transmitting the graphical output and the first set of touch inputs to the remote display comprises at least one of:

compositing the visual representation of the first set of touch inputs into the graphical output; and transmitting the first set of touch inputs as auxiliary data associated with the graphical output to the remote display.

10. The computer-implemented method defined in claim 1, wherein transmitting the graphical output and the first set of touch inputs to the remote display comprises:

transmitting the graphical output to the remote display in a selected communication channel; and transmitting the first set of touch inputs to the remote display in a sideband communication channel associated with the selected communication channel.

11. A computer-implemented method for interacting with an electronic device, comprising:

receiving a graphical output and a first set of touch inputs associated with the graphical output from a touch screen display in the electronic device; and using the graphical output and a visual representation of the first set of touch inputs to drive a remote touch screen display, wherein the visual representation of the first set of touch inputs is not displayed on the touch screen display in the electronic device, and wherein using the graphical output and the visual representation of the first set of touch inputs to drive the remote touch screen display comprises:

drawing the graphical output to a first buffer;

drawing the visual representation of the first set of touch inputs to a second buffer; and using the first and second buffers to drive the remote touch screen display.

12. The computer-implemented method of claim 11, further comprising:

decoding the graphical output prior to using the graphical output to drive the remote touch screen display.

13. The computer-implemented method of claim 11, further comprising:

obtaining a second set of touch inputs associated with the graphical output from the remote touch screen display; and transmitting the second set of touch inputs to the electronic device, wherein the second set of touch inputs is used by the electronic device to update the graphical output.

14. The computer-implemented method of claim 13, wherein the second set of touch inputs is further used by the electronic device to transmit data to the remote touch screen display.

15. A system for facilitating interaction between an electronic device and a remote display, comprising:

a first application on the electronic device, wherein the first application is configured to:

obtain a graphical output for a display of the electronic device;

obtain a first set of touch inputs associated with the graphical output from a first touch screen on the electronic device; and transmit the graphical output and the first set of touch inputs to the remote display, wherein transmitting the graphical output and the first set of touch inputs to the remote display comprises:

transmitting the graphical output to the remote display in a selected communication channel; and transmitting the first set of touch inputs to the remote display in a sideband communication channel associated with the selected communication channel; and a second application on the remote display, wherein the second application is configured to use the graphical output and a visual representation of the first set of touch inputs to drive the remote display, and wherein the visual representation of the first set of touch inputs is not displayed on the display of the electronic device.

16. The system of claim 15, further comprising:

an encoding apparatus on the electronic device, wherein the encoding apparatus is configured to encode the graphical output prior to transmitting the graphical output to the remote display; and a decoding apparatus on the remote display, wherein the decoding apparatus is configured to decode the graphical output prior to using the graphical output to drive the remote display.

17. The system of claim 15, wherein the second application is further configured to:
obtain a second set of touch inputs associated with the graphical output from a second touch screen on the remote display; and
transmit the second set of touch inputs to the electronic device, wherein the first application is further configured to update the graphical output based on the second set of touch inputs.

18. The system of claim 17, wherein the first application is further configured to identify the remote display as a source of the second set of touch inputs.

19. The system of claim 18, wherein the identified remote display enables at least one of:
modification of the graphical output by the first application prior to transmitting the graphical output to the remote display; and
transmission of data from the first application to the remote display based on the second set of touch inputs.

20. The system of claim 15, wherein transmitting the graphical output and the first set of touch inputs to the remote display involves at least one of:
compositing the visual representation of the first set of touch inputs into the graphical output; and
transmitting the first set of touch inputs as auxiliary data associated with the graphical output to the remote display.

21. The system of claim 15, wherein the electronic device is at least one of a mobile phone, a tablet computer, and a portable media player.

22. A non-transitory computer-readable storage medium storing instructions that when executed by a computer cause the computer to perform a method for interacting with a remote display, the method comprising:
obtaining graphical output for a display of the computer;
obtaining a first set of touch inputs associated with the graphical output from a touch screen associated with the computer; and
transmitting the graphical output and the first set of touch inputs to the remote display, wherein the graphical output and a visual representation of the first set of touch inputs are used to drive the remote display, and wherein the visual representation of the first set of touch inputs comprises a set of dots and is not displayed on the display of the computer.

23. The non-transitory computer-readable storage medium of claim 22, the method further comprising:
receiving a second set of touch inputs from the remote display; and
updating the graphical output based on the second set of touch inputs.

24. The non-transitory computer-readable storage medium of claim 23, wherein updating the graphical output based on the second set of touch inputs comprises:
providing the second set of touch inputs to an application configured to generate the graphical output.

25. The non-transitory computer-readable storage medium of claim 22, wherein transmitting the graphical output and the first set of touch inputs to the remote display comprises at least one of:
compositing the visual representation of the first set of touch inputs into the graphical output; and
transmitting the first set of touch inputs as auxiliary data associated with the graphical output to the remote display.

* * * * *